C. MACBETH AND W. E. HARDEMAN.
MANUFACTURE OF SOLID RUBBER TIRES.
APPLICATION FILED JUNE 9, 1919.
1,353,769.
Patented Sept. 21, 1920.
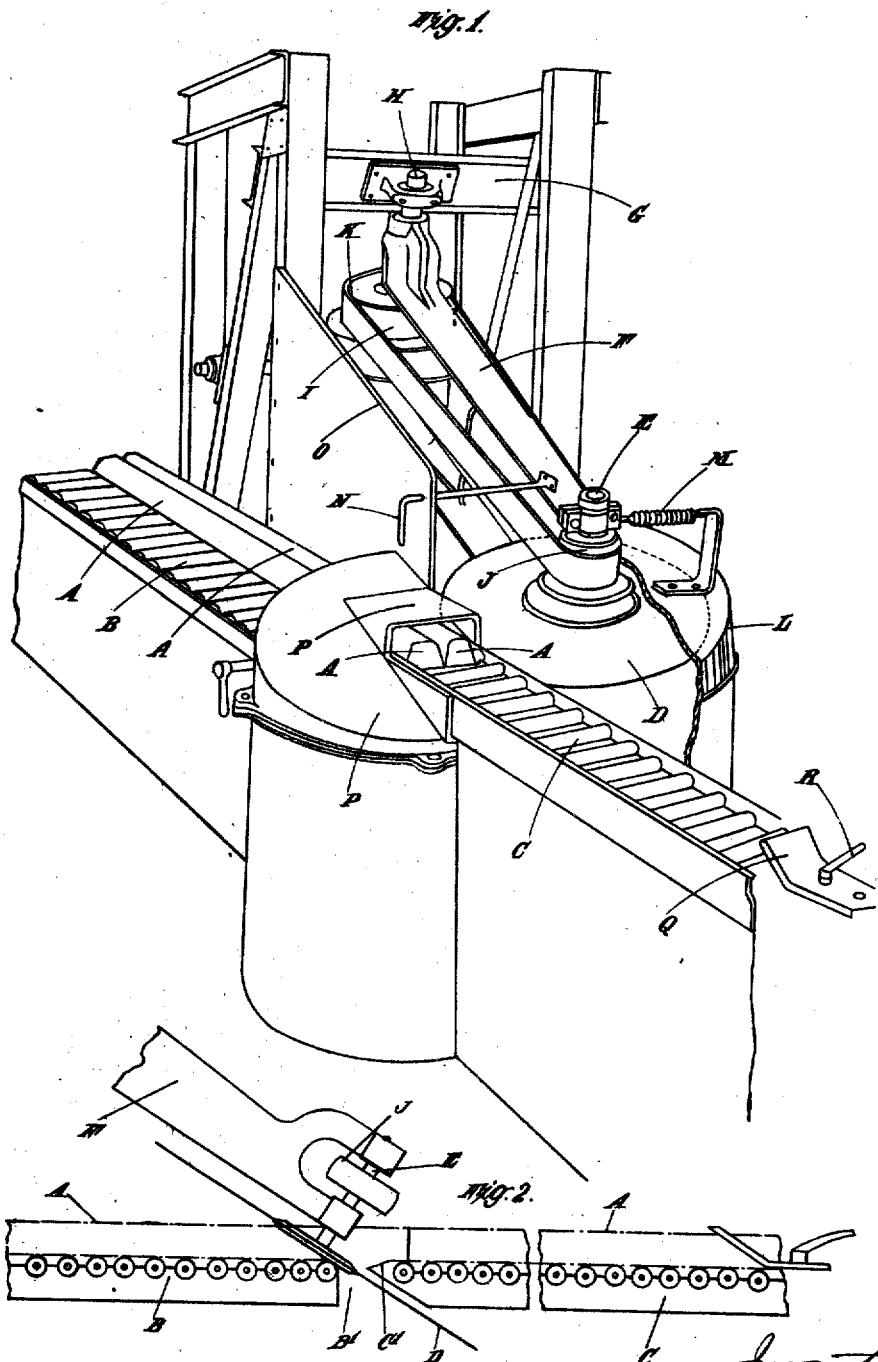

UNITED STATES PATENT OFFICE.

COLIN MACBETH AND WILLIAM EDWARD HARDEMAN, OF BIRMINGHAM, ENGLAND, ASSIGNORS TO THE DUNLOP RUBBER COMPANY, LIMITED, OF WESTMINSTER, ENGLAND.

MANUFACTURE OF SOLID RUBBER TIRES.

1,353,769.

Specification of Letters Patent.   Patented Sept. 21, 1920.

Application filed June 9, 1919. Serial No. 302,920.

*To all whom it may concern:*

Be it known that we, COLIN MACBETH and WILLIAM EDWARD HARDEMAN, both subjects of the King of Great Britain, residing at Para Mills, Aston Cross, Birmingham, in the county of Warwick, England, have invented certain new and useful Improvements in or Relating to the Manufacture of Solid Rubber Tires, of which the following is a specification.

This invention relates to the manufacture of solid rubber tires, the chief object being to provide improved means for cutting or beveling the ends of the rubber portions or treads of the tires (hereinafter referred to as the tires) while in strip form, that is prior to the tires being fitted around the foundation bands.

According to this invention one or more tires in strip form are supported in close proximity to a circular rotating cutter or knife which is adapted to be moved to cut the ends of the tires to shape them as required to produce a suitable join when the tire assumes its circular form. The said knife is preferably mounted in a swinging bracket at the side of the track supporting the tire or tires and in a plane inclined to the plane of the track so that by transversely moving the knife across the tires it cuts and bevels the ends thereof; the knife may however be located above or below the tires. After the tires have been cut and beveled at one end they are moved forward until their cut ends come into contact with a stop which can be set to any predetermined position so as to determine the exact position at which the cut at the other end of the tires is to be effected. This stop therefore enables the tires to be cut to the desired length and insures that the cut or beveled surfaces at the two ends are parallel with each other.

In order that the invention may be clearly understood and readily carried into effect, the same will now be more fully described with reference to the accompanying diagrammatic drawings in which:—

Figure 1 illustrates in perspective one construction of the improved apparatus.

Fig. 2 is a side view of part of the apparatus shown in Fig. 1 illustrating the angular position of the knife relatively to the tires.

A A represents two tires in strip form which are adapted to be moved by hand or otherwise along a horizontal roller track B on to a roller track C. D is the cutting knife which, as shown, is of disk form and is mounted on a spindle E in a position inclined to the horizontal, the spindle being supported at one end of a swinging bracket F whose other end is mounted on a shaft H supported on a frame G, so that the frame can be angularly moved about the axis of the shaft H. The roller tracks may be inclined to obtain the advantage of the action of gravity in moving the tires along the tracks, in which case the position of the knife would be arranged to suit the inclination of the tracks. The knife is adapted to be rotated by means of a belt I passing around a pulley J on the knife spindle E and around a pulley K at the other end of the swinging frame, which pulley K is driven by any appropriate gearing, not shown. The knife is maintained in an inoperative position within a casing L out of the path of the tires by means of a spring M. Between the two tracks B and C is a space B' (see Fig. 2) into which the rotating knife can be moved by pulling the swinging bracket F toward the tires for which purpose a handle N secured to the frame extends through a plate O in a convenient position to be pulled by the operator when it is desired to effect the cutting operation. As shown in Fig. 2 curved plate C' is provided at the end of the track C adjacent to the cutting space B' to afford adequate support for the tires at this point. Adjacent to the position where the cutting of the tires is effected, a casing or guard P is provided which is so shaped as to form a passage way or guide to allow the tires to be passed under the same as shown and which also serves to cover the knife when moved as aforesaid and thus safeguard the operator against being injured by the rotating knife. Owing to the angular position of the knife relatively to the tires it cuts the tires at an angle to the length thereof thus producing the beveled ends. After the forward or leading edges of the tire have been cut or beveled by moving the knife as aforesaid, the operator releases the handle N so that the spring M restores the knife to the inoperative position within the casing L. The tires can then be moved forward by hand or otherwise along the track C so that the beveled ends are brought into contact with an inclined stop Q mounted on a suitable support the inclination of which stop corresponds to the inclination of the beveled ends of the tires. The operator then pulls the knife by means of the handle N so as to cut the rear ends of the tires and thus produce beveled ends corresponding to and parallel with the beveled ends at the leading or forward ends of the tires. The stop may be adjustable to any suitable position and readily clamped therein by a nut R so as to determine the exact position at which the rear ends of the tires are to be cut and the length of tire which is to be formed. It will be observed that the cut is made by the portion of the knife between the tires and the knife spindle, thus insuring that the knife spindle has ample clearance and reducing the diameter of the knife as compared with that which would be required if the knife were disposed above or below the tires. After the two ends of the tires have been cut the latter are ready to be applied to the foundation bands and the inclined or beveled ends of each tire according to the example shown meet when the tire is placed around the band and are joined together to form a kind of lap joint. The track B which receives two tires may be wider than the track C which need only receive one tire. As shown in the drawings a plurality of small tires may be cut simultaneously but large tires are cut separately, and the tire or tires may be supported in any desired position and the ends cut or beveled to enable any suitable form of join to be made (according to the size or type of tire) when the tire assumes its circular form. Solid rubber tires of any type may be cut or beveled by this machine and double spewed tires, either before or after longitudinal division as set forth in the specifications of concurrent British applications Nos. 10337 and 10342 of 1918 may be cut or beveled by this machine.

What we claim and desire to secure by Letters Patent of the United States is:—

1. In an apparatus for beveling the ends of solid rubber tire strips, the combination of a rotating cutter, a support for a solid rubber tire strip adapted to position such strip in a plane inclined to the plane of the cutter and with the length of the strip extending transversely of the cutting edge, and means for effecting relative bodily movement between the support and cutter, whereby the strip will be severed and formed with a bevel end.

2. In an apparatus for beveling the ends of solid rubber tire strips, the combination of a rotating cutter, a support adapted to position a solid rubber tire strip in a plane inclined to that of the cutter, means for effecting relative bodily movement between the cutter and support, to sever the strip and form a bevel end thereon, and a stop on said support having an inclined face corresponding to the beveled end of a tire strip and adapted to coöperate with such beveled end to determine the length of tires cut from the strip.

3. In an apparatus for beveling the ends of solid rubber tire strips, the combination of a support over which a solid rubber tire strip is adapted to be moved longitudinally, a rotating cutter arranged in a plane inclined to the plane of the support and the tire strip thereon, means for moving the cutter to sever the strip transversely and form a beveled end thereon, and means for coöperating with an edge of the strip to afford lateral support therefor during the cutting operation.

4. In an apparatus for the purpose described, the combination of a support over which a solid rubber tire strip is adapted to be moved longitudinally, a rotating cutter arranged at one side of, and in a plane inclined to the plane of the support and a tire strip thereon, means for moving the cutter to sever the strip and form a bevel end thereon, and means providing a lateral support for the edge of the strip remote from the cutter.

5. In an apparatus for the purpose described, the combination of a support for a solid rubber tire strip, a swinging bracket at one side of said support, a circular rotating cutter mounted in said bracket and arranged in a plane inclined to that of said support, and means for swinging the bracket to cause the cutter to sever a strip on the support and form a beveled end thereon.

6. In an apparatus for the purpose described, the combination of a support for a solid rubber tire strip, a swinging bracket at one side of said support, a circular rotating cutter mounted in said bracket and arranged in a plane inclined to said support, a spring acting to hold the bracket away from the support, and means for swinging the bracket against the action of the spring to cause the cutter to sever a strip on the support and form a beveled end thereon.

7. In an apparatus for the purpose described, the combination of a sectional track-like support over which a solid rubber tire strip is adapted to be moved longitudinally, adjacent sections of said support being suitably separated, a rotating cutter arranged in a plane inclined to the plane of the support and positioned opposite the space between said sections of the support, and means for moving the cutter into the space separating the track sections to sever a strip on the support and bevel the adjacent ends of the severed sections.

8. In an apparatus for the purpose described, the combination of an inclined roller track way adapted to permit a solid rubber tire strip to be moved thereover, an adjustable stop adapted to limit movement of the tire strip along the track way, a rotating cutter arranged in a plane inclined to the plane of the track way, and means for moving said cutter to cause it to sever a tire strip on the track way and form a beveled end thereon.

9. The herein described method of shaping the ends of solid rubber tires, prior to applying them to foundation bands, which comprises supporting a tire strip adjacent and in a plane inclined to the plane of a rotating cutter, and effecting relative bodily movement between the cutter and support to sever the strip and form a beveled end thereon.

10. In an apparatus for beveling the ends of solid rubber tire strips, the combination of a rotating cutter, a support for a tire strip adapted to position such strip in a plane inclined to the plane of the cutter, means for moving the cutter bodily transversely of the support to sever the strip thereon and form a beveled end, and a guard arranged to extend over the cutter when it is positioned to sever the strip.

11. In an apparatus for beveling the ends of solid rubber tire strips, the combination of a rotating cutter, a support for a tire strip adapted to position such strip in a plane inclined to the plane of the cutter, means for moving the cutter bodily transversely of the support to sever the strip thereon and form a beveled end, and a guard arranged to provide a lateral support for the strip while it is being severed and having a top which extends over the cutter when the latter is in cutting relation to the strip.

COLIN MACBETH.
WILLIAM EDWARD HARDEMAN.